United States Patent
Amaral

(10) Patent No.: US 6,895,773 B2
(45) Date of Patent: May 24, 2005

(54) HEAT PUMP APPARATUS FOR REGULATING MOTOR VEHICLE TEMPERATURE

(75) Inventor: Manuel Amaral, Vitry sur Seine (FR)

(73) Assignee: Peugeot Citroen Automobiles SA, Neuilly sur Seine (FR)

(*) Notice: Subject to any disclaimer, the term of this patent is extended or adjusted under 35 U.S.C. 154(b) by 0 days.

(21) Appl. No.: 10/276,067

(22) PCT Filed: Mar. 26, 2001

(86) PCT No.: PCT/FR01/00910
§ 371 (c)(1),
(2), (4) Date: Jan. 8, 2003

(87) PCT Pub. No.: WO01/87653
PCT Pub. Date: Nov. 22, 2001

(65) Prior Publication Data
US 2004/0050089 A1 Mar. 18, 2004

(30) Foreign Application Priority Data
May 15, 2000 (FR) .......................... 00 06116

(51) Int. Cl.⁷ ...................... B60H 1/32; F25B 13/00; F25D 17/02
(52) U.S. Cl. ...................... 62/324.1; 62/434; 62/244
(58) Field of Search ............... 62/324.1, 434, 62/435, 244, 243, 498, 96, 99; 165/202, 240, 42, 43

(56) References Cited
U.S. PATENT DOCUMENTS

| | | | |
|---|---|---|---|
| 2,893,218 A | 7/1959 | Harnish | |
| 5,265,437 A | 11/1993 | Saperstein et al. | |
| 5,537,956 A | 7/1996 | Rennfeld et al. | |
| 6,038,877 A | * 3/2000 | Peiffer et al. | 62/244 |
| 6,457,324 B2 | 10/2002 | Zeigler et al. | |
| 6,640,889 B1 | * 11/2003 | Harte et al. | 165/202 |
| 6,662,864 B2 | * 12/2003 | Burk et al. | 165/202 |

FOREIGN PATENT DOCUMENTS

| | | |
|---|---|---|
| DE | 199 30 148 A1 | 1/2000 |
| EP | 0 595 714 A1 | 5/1994 |
| EP | 0970 833 A1 | 1/2000 |
| FR | 2 697 210 | 4/1994 |

* cited by examiner

Primary Examiner—Chen Wen Jiang
(74) Attorney, Agent, or Firm—Oliff, & Berridge, PLC

(57) ABSTRACT

This temperature regulation apparatus comprises a heat pump (12) comprising a main compression circuit (14) for a refrigerant fluid taking heat from a cold source (16) and transferring it to a hot source (18). The cold source (16) comprises a first heat exchanger (24) for exchanging heat between the refrigerant fluid and a coolant liquid thermally coupling the main refrigerant circuit (14) to a first secondary coolant circuit (26) capable of being selectively connected to an "outside" heat exchanger (30) and to a "cold" heat exchanger (32). The hot source (18) comprises a second heat exchanger (34) for exchanging heat between the refrigerant fluid and a coolant liquid thermally coupling the main refrigerant circuit (14) to a second secondary coolant circuit (36) capable of being selectively connected to at least the outside heat exchanger (30) and to a "hot" heat exchanger (39). The invention is applicable in particular to air conditioning a motor vehicle cabin and/or to regulating the temperature of a part of said vehicle.

16 Claims, 7 Drawing Sheets

HEAT PUMP APPARATUS FOR REGULATING MOTOR VEHICLE TEMPERATURE

The present invention relates to improved heat pump apparatus for regulating motor vehicle temperature.

It applies in particular to air conditioning a motor vehicle cabin and/or to regulating the temperature of a part of said vehicle.

The state of the art, and in particular FR-2 697 210, discloses motor vehicle temperature regulation apparatus of the type comprising:

- a heat pump comprising a main compression circuit for a refrigerant fluid taking heat from a cold source to transfer it to a hot source;
- the cold source comprising a first heat exchanger for exchanging heat between the refrigerant fluid and a coolant liquid, thermally coupling the main refrigerant circuit to a first secondary coolant circuit capable of being selectively connected to at least two heat exchangers; and
- the hot source comprising a second heat exchanger for exchanging heat between the refrigerant fluid and a coolant liquid, thermally coupling the main refrigerant circuit to a second secondary coolant circuit capable of being selectively connected to at least two heat exchangers.

As a general rule, the compression circuit comprises an evaporator in heat exchange with the cold source, and a condenser in heat exchange with the hot source, these elements being connected together by a compressor and an expander. The refrigerant vaporizes in the evaporator, thereby taking heat from the cold source. The compressor draws in the vaporized refrigerant and delivers it into the compressor which is cooled by heat exchange with the hot source and in which the refrigerant condenses. The condenser allows the refrigerant in the liquid state to pass to the evaporator while lowering its pressure.

A heat pump can be used either to heat a space or a part or else to cool said space or said part.

In FR-2 697 210, the secondary circuits are capable of being selectively connected via appropriate valves to an outside heat exchanger placed in the engine compartment of the vehicle, and to an inside heat exchanger placed in the vehicle cabin. By acting on the valves, it is possible to use the heat exchanger either to cool the vehicle cabin (in which case the hot source is the outside heat exchanger and the cold source is the inside heat exchanger), or else to heat the cabin (in which case the hot source is the inside heat exchanger and the cold source is the outside heat exchanger).

It should be observed that in the second case the performance of the heat pump is limited by the temperature of the outside air. In the cold season, air temperature is not sufficient to obtain satisfactory efficiency for the heat pump when it is used for the purpose of heating the cabin. Furthermore, frosting of the cold source in the cold season can degrade the performance of the heat pump in operation.

Furthermore, the reversibility of the outside and inside heat exchangers (each of which is used either as a hot source or as a cold source) leads essentially to the following two drawbacks:

1) the performance of each heat exchanger is limited by the fact that it cannot be optimized for specific operation of the heat exchanger either as a hot source or else as a cold source; and 2) it is difficult to control the humidity of the air in the vicinity of the inside heat exchanger.

The second drawback is particularly troublesome when air conditioning the vehicle cabin in mid-season. Under such circumstances, the inside heat exchanger is likely to be subjected to frequent changeovers in its mode of operation between refrigerating and heating the cabin. Thus, in refrigerating mode, the inside heat exchanger picks up water. On switching to heating mode, the water accumulated while refrigerating is exhausted into the cabin by evaporation. FR-2 697 210 proposes mitigating that drawback by means of an auxiliary heat exchanger placed close to the inside heat exchanger. Nevertheless, that auxiliary heat exchanger is not functional under certain circumstances, in particular for mid-season temperatures of around 15° C.

An object of the invention is to optimize the performance of heat pump temperature regulation apparatus, in particular when it is used for heating or refrigerating the cabin of a motor vehicle, or indeed when it is used for regulating the temperature of a part of said vehicle.

For this purpose, the invention provides motor vehicle temperature regulation apparatus of the above-specified type, characterized in that the first secondary circuit is capable of being selectively connected to an "outside" heat exchanger and to a "cold" heat exchanger, and in that the second secondary circuit is capable of being selectively connected to the outside heat exchanger and to a "hot" heat exchanger.

According to other characteristics of various embodiments of this apparatus:

- the cold and hot heat exchangers are arranged in a cabin of the vehicle;
- the outside heat exchanger is a coolant/air heat exchanger;
- the cold heat exchanger is a coolant/air heat exchanger;
- the hot heat exchanger is a coolant/air heat exchanger;
- the first secondary coolant circuit includes a three-port valve connected to the outlet of the first refrigerant/coolant heat exchanger of the cold source, to the inlet of the outside heat exchanger, and to the inlet of the cold heat exchanger;
- the second secondary coolant circuit includes a three-port valve connected to the outlet of the second refrigerant/coolant heat exchanger of the hot source, to the inlet of the outside heat exchanger, and to the inlet of the hot heat exchanger;
- the first and second secondary coolant circuits include a common three-port valve connected to the inlet of the first refrigerant/coolant heat exchanger of the cold source, to the inlet of the second refrigerant/coolant heat exchanger of the hot source, and to the outlet of the outside heat exchanger;
- the first secondary circuit is capable of being selectively connected to a supplementary outside heat exchanger;
- the supplementary outside heat exchanger exchanges heat between the coolant liquid and a vector of heat coming directly or indirectly from a gas, in particular an exhaust gas of the vehicle engine, a liquid, in particular a cooling liquid of the vehicle engine, or a solid, in particular at least one electrical or electronic component of the vehicle, said heat vector being selected so that the supplementary outside heat exchanger acts relative to the coolant circulating in the first secondary circuit as a cold source that is hotter than the outside heat exchanger;
- the first secondary coolant circuit includes a supplementary three-port valve connected to the outlet of the first refrigerant/coolant heat exchanger of the cold source, to the inlet of the outside heat exchanger, and to the inlet of the supplementary outside heat exchanger;

the hot heat exchanger is connected to a branch of a cooling liquid circuit of an engine of the vehicle, the downstream end of the branch being connected to a coolant inlet of the hot heat exchanger, and the upstream end of the branch being connected to a coolant outlet of the hot heat exchanger;

the temperature regulation apparatus includes a subsidiary heat exchanger in heat exchange with a part of the vehicle that is to be temperature-regulated, the subsidiary heat exchanger being connected in parallel with the cold and hot heat exchangers;

the first secondary coolant circuit includes a subsidiary three-port valve connected to the outlet of the first refrigerant/coolant heat exchanger of the cold source, to the inlet of the subsidiary heat exchanger, and to the inlet of the cold heat exchanger;

the second secondary coolant circuit includes a subsidiary three-port valve connected to the outlet of the second refrigerant/coolant heat exchanger of the hot source, to the inlet of the subsidiary heat exchanger, and to the inlet of the hot heat exchanger;

the first and second secondary coolant circuits include a common subsidiary three-port valve connected to the inlet of the first refrigerant/coolant heat exchanger of the cold source, to the inlet of the second refrigerant/coolant heat exchanger of the hot source, and to the outlet of the subsidiary heat exchanger;

the main refrigerant circuit having the two heat exchangers in which the refrigerant circulates is constituted by a plurality of segments grouped together in a single module in which the refrigerant fluid circulates, said module being designed to be connected to the secondary coolant circuits via the refrigerant/coolant heat exchangers, said segments being connected to one another preferably by welding; and the coolant liquid in at least one of the first and second secondary circuits is a mixture of water and antifreeze.

The invention will be better understood on reading the following description given purely by way of example and made with reference to the accompanying drawings, in which:

FIGS. 1 to 3 show motor vehicle temperature regulation apparatus constituting a first embodiment of the invention, and given overall reference 10.

Figure 1:
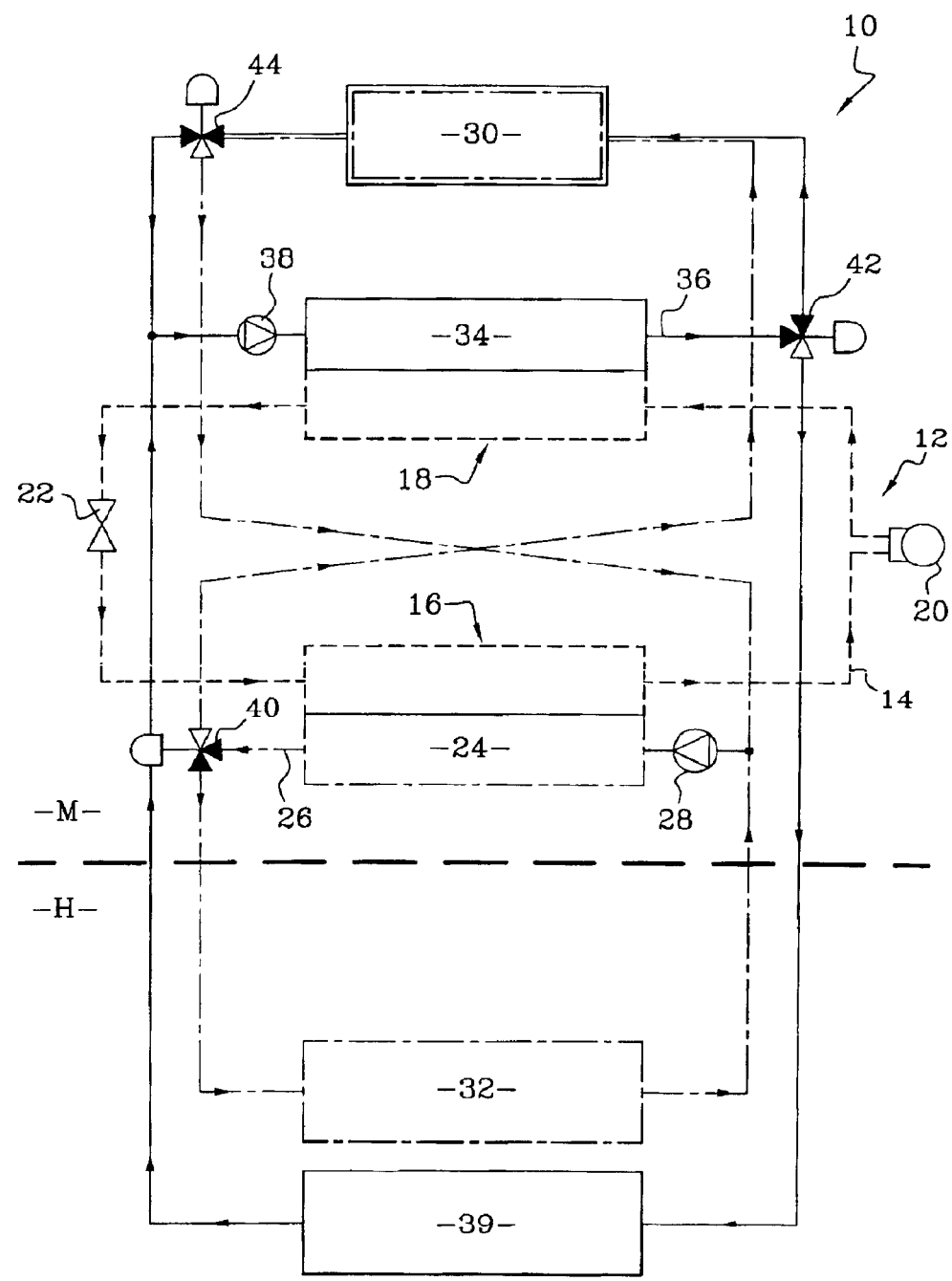
FIGS. 1 to 3 are diagrammatic views in three respective different configurations of use of motor vehicle temperature regulation apparatus in a first embodiment of the invention.

In the description below, two parts are said to be thermally coupled together when they exchange heat between each other by means of a suitable heat exchanger.

The temperature regulation apparatus 10 comprises a heat pump 12 having a main refrigerant circuit 14 of the compression type taking heat from a cold source 16 and transferring at least some of it to a hot source 18.

The cold and hot sources 16 and 18 are connected together by a compressor 20 (electrically or mechanically driven) and an expander valve 22. The refrigerant vaporizes taking heat from the cold source 16. the compressor 20 draws in the vaporized refrigerant and delivers it to the hot source where it condenses and cools. The expander valve 22 allows the refrigerant to pass in liquid form towards the cold source 16 by lowering its pressure. The refrigerant circulates around the circuit 14 in the direction marked by arrows in FIG. 1.

The cold source 16 comprises a first refrigerant/coolant heat exchanger 24 thermally coupling the main refrigerant circuit 14 to a first secondary circuit 26 for liquid coolant. This circuit includes a pump 28 for circulating the liquid coolant, which pump is connected to the inlet of the first heat exchanger 24.

The first secondary circuit 26 is capable of being selectively connected to an "outside" heat exchange 30 and to a "cold" heat exchanger 32.

Figure 2:
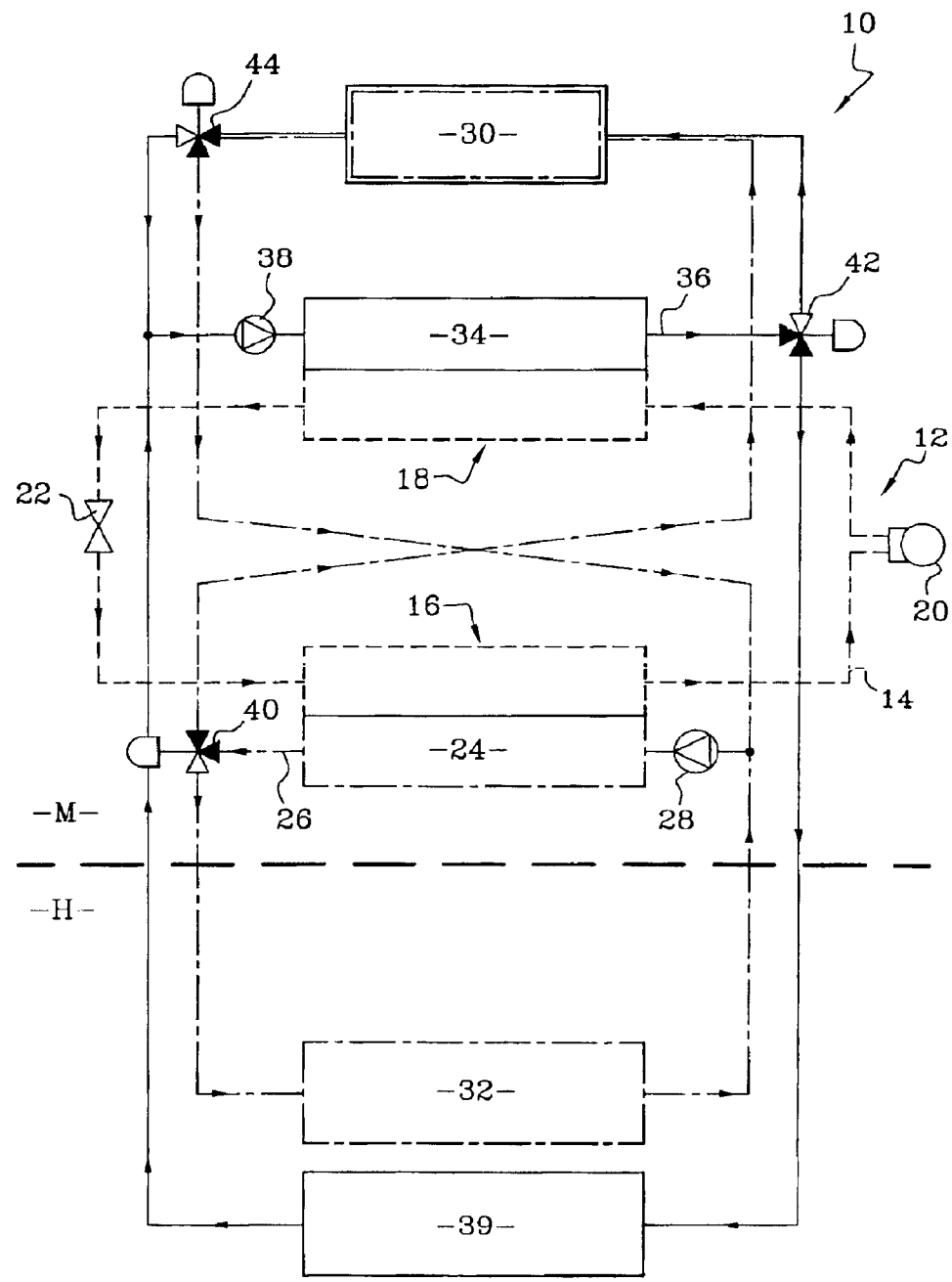
Figure 3:
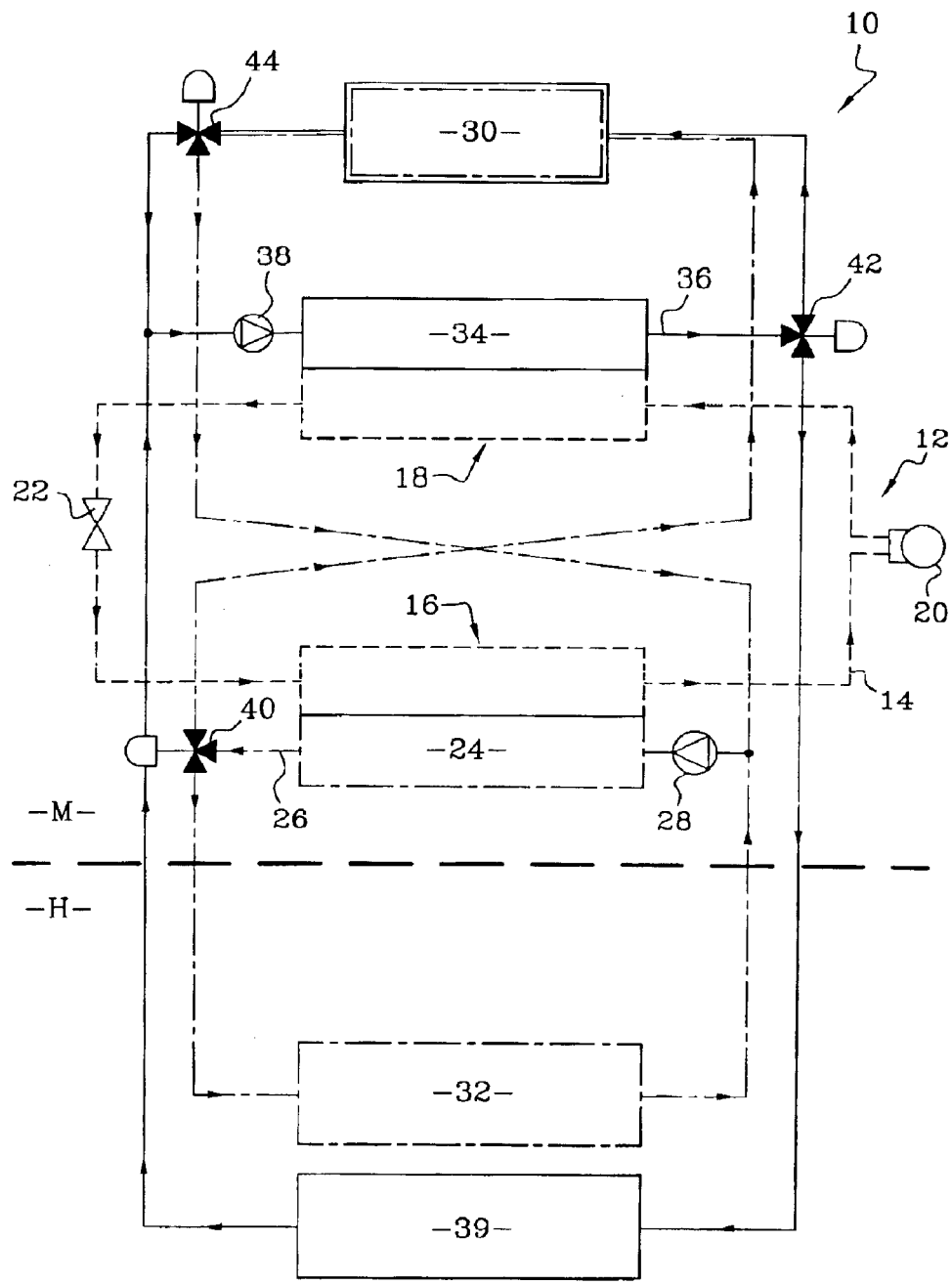

In the example shown in FIGS. 1 to 3, the outside heat exchanger 30 is a coolant/air heat exchanger placed in the engine compartment M of the vehicle, and the cold heat exchanger 32 is a coolant/air heat exchanger placed in the vehicle cabin H.

The hot source 18 has a second refrigerant/coolant heat exchanger 34 thermally coupling the main refrigerant circuit 14 to a second secondary circuit 36 for liquid coolant. This second secondary circuit comprises a pump 38 for circulating the liquid coolant, which pump is connected to the inlet of the second heat exchanger 34.

The second secondary circuit 36 is capable of being selectively connected to the outside heat exchanger 30 and to a "hot" heat exchanger 39.

In the example shown in FIGS. 1 to 3, the hot heat exchanger 39 is a coolant/air heat exchanger placed in the vehicle cabin H.

A conventional fan (not shown in the figures) serves to cause a flow of air to circulate through the cold and hot heat exchangers 32 and 39.

The heat pump 12 connected to the first and second heat exchangers 24 and 34 is located, for example, in the engine compartment of the vehicle.

The refrigerant fluid circulating in the main circuit is of conventional type. This refrigerant fluid is selected, for example, from chlorine or fluorine derivatives of methane or ethane (Freon), hydrocarbons, ammonia, or carbon dioxide.

Figure 7:
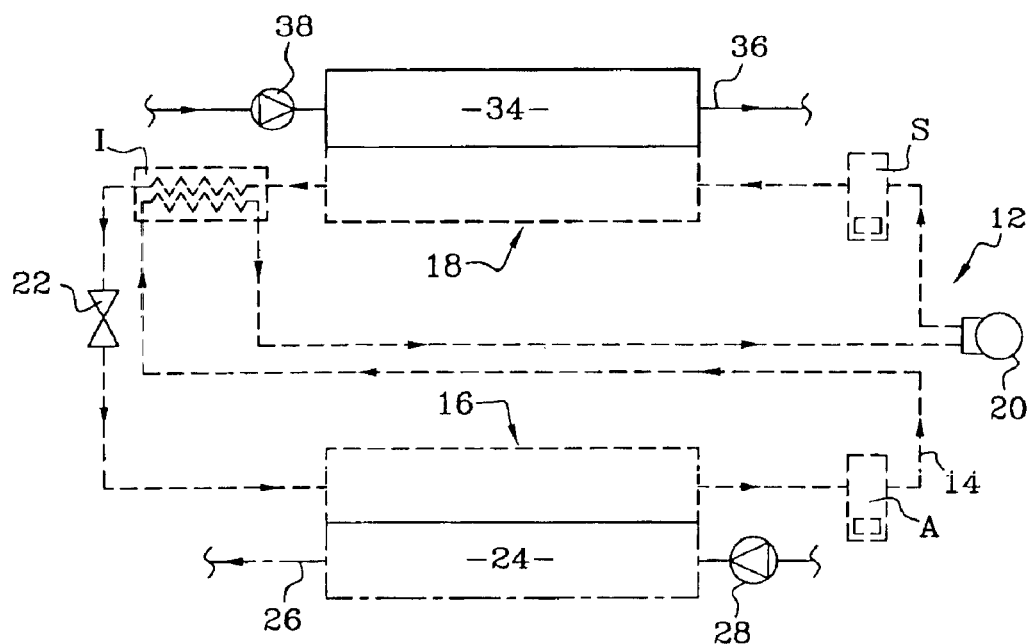
FIG. 7 is a diagrammatic view of a heat pump using carbon dioxide as the refrigerant fluid and suitable for fitting to temperature regulation apparatus in any of the embodiments.

When using carbon dioxide, the heat pump 12 is fitted with conventional parts that are specific to this use. FIG. 7 shows a heat pump 12 adapted to using carbon dioxide. In this case, the circuit 14 includes an accumulator A connected to the outlet of the first heat exchanger 24 (also referred to as an "evaporator") and an oil separator S (for separating-out oil coming from the compressor 20) connected between the compressor 20 and the second heat exchanger 34 (also referred to as the "gas cooler"). The carbon dioxide circuit 14 also has an internal heat exchanger I thermally coupling a branch of the circuit 14 connecting the second heat exchanger 34 to the expander valve 22 with a branch of the circuit 14 connecting the accumulator A to the compressor 20. The accumulator A, the separator S, and the internal heat exchanger I are conventional parts commonly used in heat pumps making use of carbon dioxide as the refrigerant fluid.

The coolant liquid circulating in the first or second coolant circuit 26 or 36 is preferably a mixture of water and antifreeze (glycol).

The two secondary coolant circuits 26 and 36 are connected respectively to the outside, cold, and hot heat exchangers 30, 32, and 39 by means of a three-port valve 40 in the first secondary circuit, a three-port valve 42 in the second secondary circuit, and a three-port valve 44 common to both secondary circuits.

The three-port valve 40 of the first secondary circuit 26 is connected to the outlet of the first refrigerant/coolant heat exchanger 24 of the cold source, to the inlet of the-outside heat exchanger 30, and to the inlet of the cold heat exchanger 32.

The valve 42 of the second secondary circuit 36 is connected to the outlet of the second refrigerant/coolant heat exchanger 34 of the hot source, to the inlet of the outside heat exchanger 30, and to the inlet of the hot heat exchanger 39.

The valve 44 common to both the first and the second secondary circuits 26 and 36 for the coolant liquid is connected to the inlet of the first refrigerant/coolant heat exchanger 24 of the cold source, to the inlet of the second refrigerant/coolant heat exchanger 34 of the hot source, and to the outlet of the outside heat exchanger 30.

The valves 40 to 44 are controlled by conventional electrical means.

FIG. 1 shows the configuration of the temperature regulation apparatus 10 in vehicle cabin refrigerating mode. Under these circumstances, the valves 40 to 44 are set so as to connect the first secondary coolant circuit 26 to the cold heat exchanger and the second secondary coolant circuit 36 to the outside heat exchanger 30.

The coolant of the first secondary circuit 26 takes heat from the cabin via the cold heat exchanger 32 and delivers it to the vaporized refrigerant via the first refrigerant/coolant heat exchanger 24.

The coolant of the second secondary circuit 36 takes heat from the condensed refrigerant via the second refrigerant/coolant heat exchanger 34 and delivers it to outside the vehicle via the outside heat exchanger 30.

FIG. 2 shows the apparatus 10 in a cabin-heating configuration. Under these circumstances, the valves 40 to 44 are set so as to connect the first secondary coolant circuit 26 to the outside heat exchanger 30 and the second secondary coolant circuit 36 to the hot heat exchanger 39.

The coolant of the first second secondary circuit 36 takes heat from outside the vehicle via the outside heat exchanger 30 and delivers it to the vaporized refrigerant via the first refrigerant/coolant heat exchanger 24.

The coolant of the second secondary circuit 36 takes heat from the condensed refrigerant via the second refrigerant/coolant heat exchanger 34 and delivers it to the cabin via the hot heat exchanger 39.

FIG. 3 shows the apparatus 10 in a configuration in which both secondary circuits 26 and 36 are connected simultaneously to the cold and hot heat exchangers 32 and 39 by appropriate settings of the valves 40 to 44. This configuration makes it possible, for example, to accelerate cabin heating while controlling the relative humidity therein.

Figure 4:
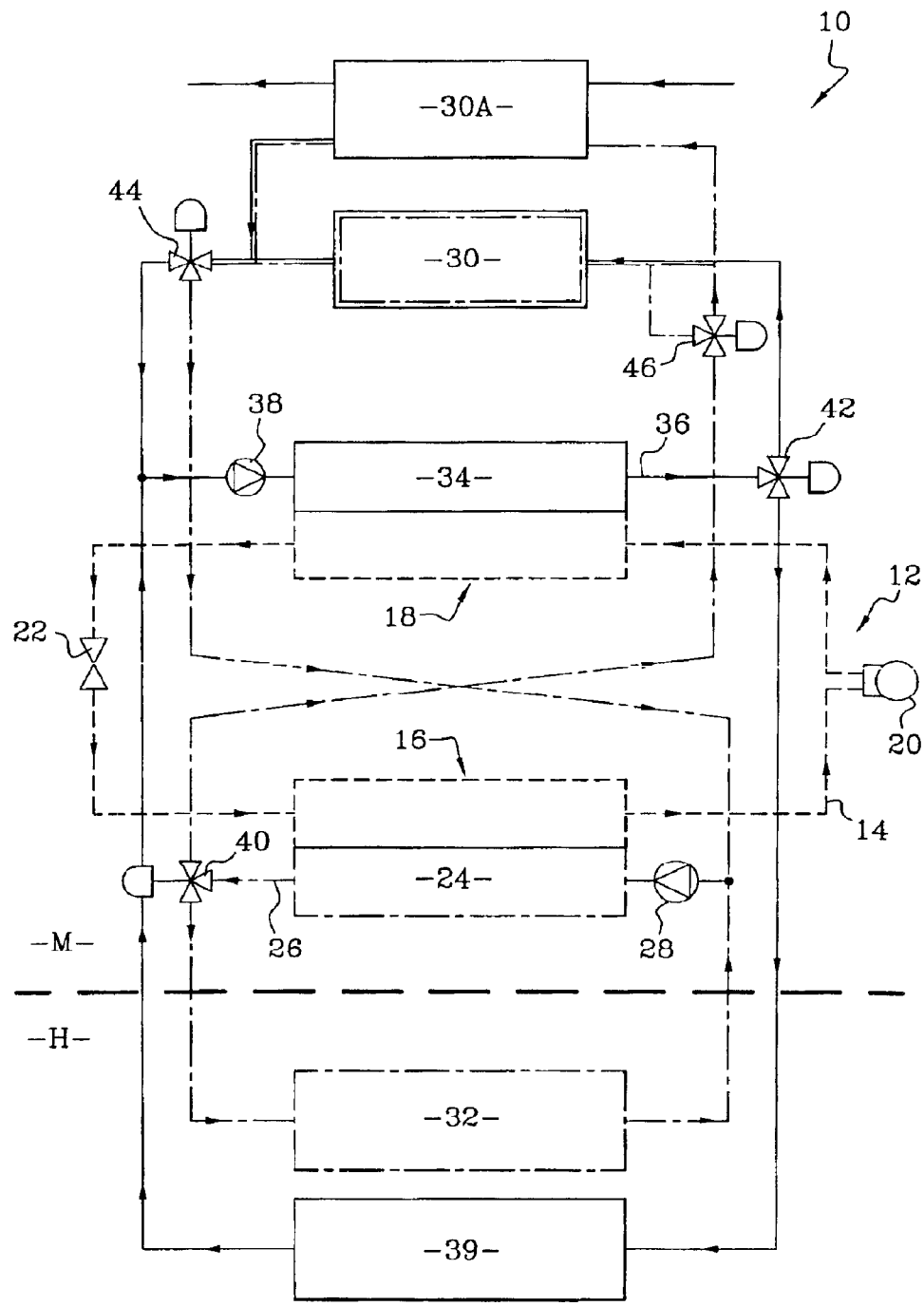
FIGS. 4 to 6 are views similar to the preceding figures showing motor vehicle temperature regulation apparatus in respectively second, third, and fourth embodiments of the invention.
Figure 5:
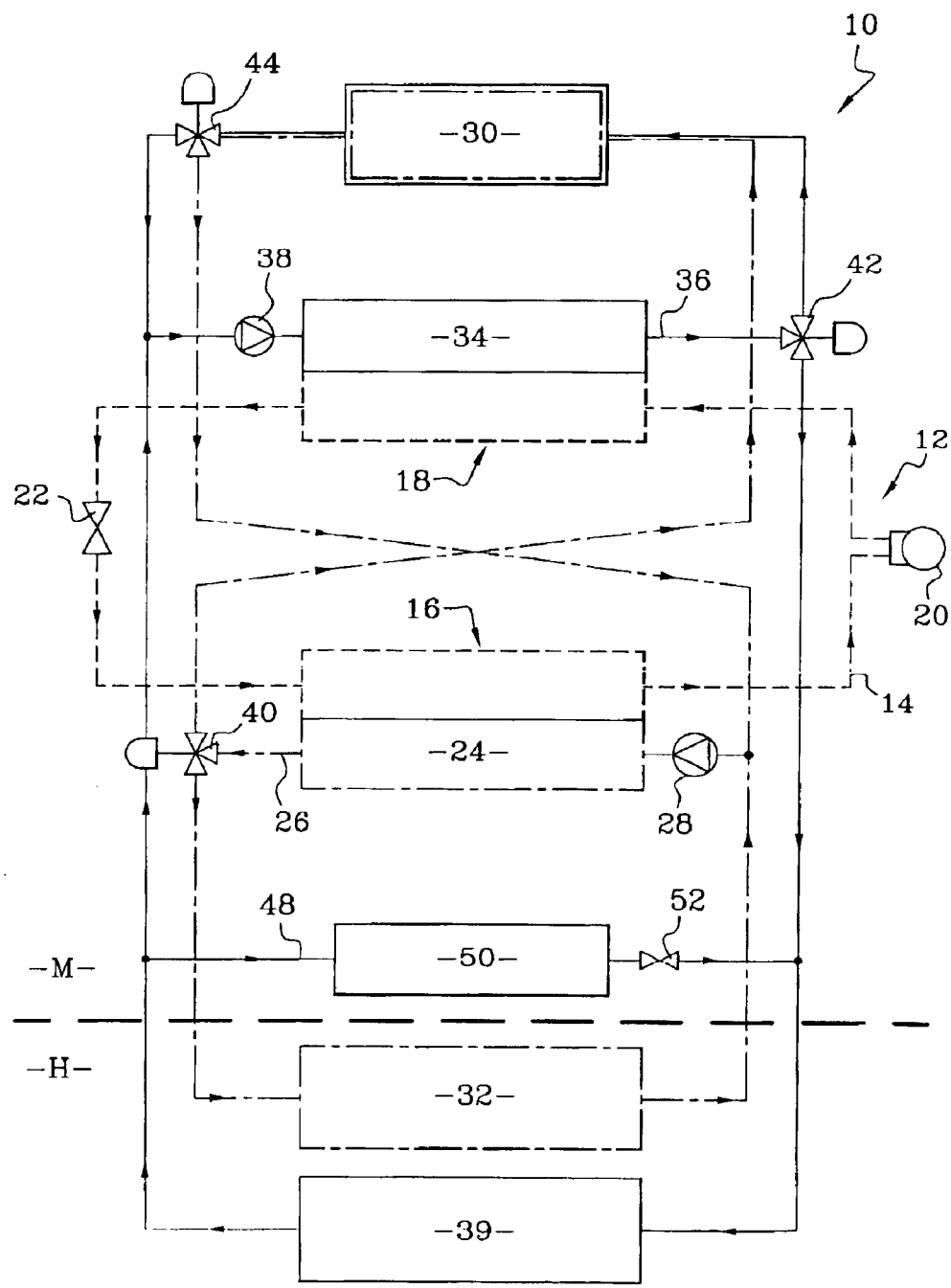
Figure 6:
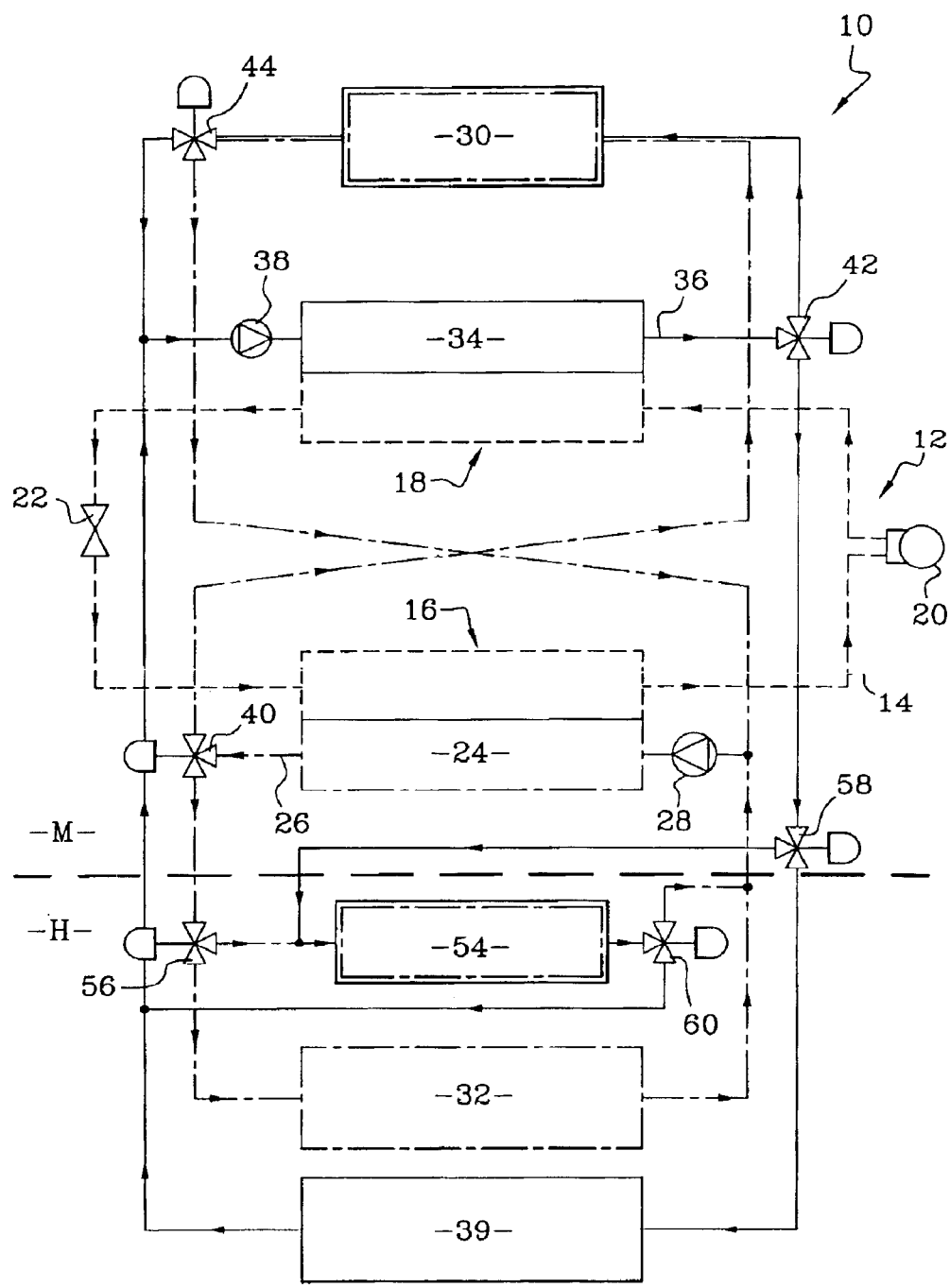

FIGS. 4 to 6 show second, third, and fourth embodiments of the temperature regulation apparatus 10 of the invention. In these FIGS. 4 to 6, elements analogous to those in the preceding figures are designated by identical references.

In the second embodiment of the invention shown in FIG. 4, the first secondary circuit 36 is capable of being selectively connected to the cold heat exchanger 32, to the outside heat exchanger 32, and to a supplementary outside heat exchanger 30A. This heat exchanger exchanges heat between the liquid coolant and a vector for heat coming directly or indirectly from a gas, in particular the exhaust gas of the vehicle engine, a liquid, in particular the cooling liquid of the vehicle engine, or a solid, in particular at least one electrical or electronic component of the vehicle. This heat vector is selected so that the supplementary outside heat exchanger 30A acts relative to the coolant circulating in the first secondary circuit 26 as a cold source that is hotter than the outside heat exchanger 30.

The first secondary coolant circuit 26 has an additional three-port valve 46 connected to the outlet of the first refrigerant/coolant heat exchanger 24 of the cold source 16, to the inlet of the outside heat exchanger 30, and to the inlet of the supplementary outside heat exchanger 30A.

This additional valve 46 enables the first secondary circuit 26 to be selectively connected to the outside heat exchanger 30 and to the supplementary outside heat exchanger 30A. Thus, in the cold season, when the apparatus 10 is in its heating configuration, it is preferable to connect the first secondary circuit 26 to the supplementary outside heat exchanger 30A instead of connecting it to the outside heat exchanger 30 so as to avoid frosting it. Relative to the coolant circulating in the first secondary circuit 26, the supplementary outside heat exchanger 30A forms a cold source that is hotter than the outside heat exchanger 30.

It should be observed that the supplementary outside heat exchanger 30A advantageously makes it possible to recover the heat dissipated by various parts of the vehicle, which heat would generally be lost.

In the third embodiment of the invention shown in FIG. 5, the heat exchanger 39 is suitable for restoring to the cabin heat taken from the cooling liquid of the vehicle engine.

For this purpose, the hot heat exchanger 39 is connected to a branch 48 of a cooling liquid circuit for the vehicle engine 50. This engine is naturally disposed in the engine compartment M. The downstream end of the branch 48 is connected to a cooling liquid inlet of the hot heat exchanger 39. The upstream end of the branch 48 is connected to a cooling liquid outlet of the hot heat exchanger 39. Where appropriate, a valve 52 serves to control the flow rate of cooling liquid passing through the hot heat exchanger 39 from the upstream end of the branch 48.

The third embodiment of the invention enables the cabin to be heated by means of heat taken from the engine cooling circuit by using the heat exchanger 39 without having recourse to an additional heat exchanger specific to the cooling circuit.

The temperature regulation apparatus of the invention can be used for regulating temperature in a space of the vehicle other than the cabin, or for regulating the temperature of any part of the vehicle.

This possibility constitutes the subject matter of the fourth embodiment of the invention shown in FIG. 6.

In this case, the temperature regulation apparatus 10 has a subsidiary heat exchanger 54 in heat exchange with a part of the vehicle whose temperature is to be regulated, for example a part disposed inside the cabin such as an electronics unit. This subsidiary heat exchanger 54 is connected in parallel with the cold and hot heat exchangers 32 and 39 using means that are described below.

The first secondary coolant circuit 26 has a subsidiary three-port valve 56 connected to the outlet of the first refrigerant/coolant heat exchanger 24 of the cold source, to the inlet of the subsidiary heat exchanger 54, and to the inlet of the cold heat exchanger 32.

The second secondary coolant circuit 36 has a subsidiary three-port valve 58 connected to the outlet of the second refrigerant/coolant heat exchange 34 of the hot source, to the inlet of the subsidiary heat exchanger 54, and to the inlet of the hot heat exchanger 39.

The first and second secondary coolant circuits 26 and 36 have a common subsidiary three-port valve 60 connected to the inlet of the first refrigerant/coolant heat exchanger 24 of the cold source, to the inlet of the second refrigerant/coolant heat exchanger 34 of the hot source, and to the outlet of the subsidiary heat exchanger 54.

The settings of the three-port valves 56 to 60 enable the temperature of the part whose temperature is to be regulated to be controlled by controlling the flow rates of the liquid coolant in the secondary circuits 26 and 36 and passing through the subsidiary heat exchanger 54.

Amongst the advantages of the invention, it should be observed that the cold and hot heat exchangers 32 and 39 have functions that are specific, one being for cooling and the other for heating. As a result their operation can be optimized.

Furthermore, the main refrigerant circuit 14, comprising in particular the two heat exchangers 24 and 34 having the refrigerant flowing therethrough, the compressor 20, and the expander valve 22, is constituted by a plurality of segments that are advantageously grouped together in a single module within which the refrigerant circulates. The segments are preferably interconnected by welding so as to form connections that are strong and leaktight and capable of withstanding high pressures, e.g. pressures exceeding 100 bars ($10^7$ Pa), in particular when the refrigerant is constituted by carbon dioxide.

The module constituted by the refrigerant circuit may be assembled and filled with refrigerant prior to being mounted in the vehicle. On being mounted in the vehicle, the module is connected to the secondary coolant circuits 26 and 36 via the refrigerant/coolant heat exchangers 24 and 34.

The module, which is advantageously mounted in the vehicle engine compartment, is isolated from the cabin, thus avoiding any risk of refrigerant leaking into the cabin, and protecting the cabin from noise nuisance.

What is claimed is:

1. A motor vehicle temperature regulation apparatus, comprising:
   a heat pump comprising a main compression circuit for a refrigerant fluid taking heat from a cold source to transfer it to a hot source;
   the cold source comprising a first heat exchanger for exchanging heat between the refrigerant fluid and a coolant liquid, thermally coupling the main refrigerant circuit to a first secondary coolant circuit, capable of being selectively connected to an outside heat exchanger and to a cold heat exchanger;
   the hot source comprising a second heat exchanger for exchanging heat between the refrigerant fluid and a coolant liquid, thermally coupling the main refrigerant circuit to a second secondary coolant circuit, capable of being selectively connected to the outside heat exchanger and to a hot heat exchanger; and
   a subsidiary heat exchanger in heat exchange with a part of the vehicle that is to be temperature-regulated, the subsidiary heat exchanger being connected in parallel with the cold and hot heat exchangers.

2. The apparatus according to claim 1, wherein the cold and hot heat exchangers are arranged in a cabin of the vehicle.

3. The apparatus according to claim 1, wherein the outside heat exchanger is a coolant/air heat exchanger.

4. The apparatus according to claim 1, wherein the cold heat exchanger is a coolant/air heat exchanger.

5. The apparatus according to claim 1, wherein the hot heat exchanger is a coolant/air heat exchanger.

6. The apparatus according to claim 1, wherein the first secondary coolant circuit includes a three-port valve connected to an outlet of the first heat exchanger of the cold source, to an inlet of the outside heat exchanger, and to an inlet of the cold heat exchanger.

7. The apparatus according to claim 1, wherein the second secondary coolant circuit includes a three-port valve connected to an outlet of the second heat exchanger of the hot source, to an inlet of the outside heat exchanger, and to an inlet of the hot heat exchanger.

8. The apparatus according to claim 1, wherein the first and second secondary coolant circuits include a common three-port valve connected to an inlet of the first heat exchanger of the cold source, to an inlet of the second heat exchanger of the hot source, and to an outlet of the outside heat exchanger.

9. The apparatus according to claim 1, wherein the first secondary circuit is capable of being selectively connected to a supplementary outside heat exchanger and the supplementary outside heat exchanger exchanges heat between the coolant liquid and a vector of heat coming directly or indirectly from a gas, in particular an exhaust gas of the vehicle engine, a liquid, in particular a cooling liquid of the vehicle engine, or a solid, in particular at least one electrical or electronic component of the vehicle, said heat vector being selected so that the supplementary outside heat exchanger acts relative to the coolant liquid circulating in the first secondary circuit as a cold source that is hotter than the outside heat exchanger.

10. The apparatus according to claim 9, wherein the first secondary coolant circuit includes a supplementary three-port valve connected to an outlet of the first heat exchanger of the cold source, to an inlet of the outside heat exchanger, and to an inlet of the supplementary outside heat exchanger.

11. The apparatus according to claim 1, wherein the hot heat exchanger is connected to a branch of a cooling liquid circuit of an engine of the vehicle, a downstream end of the branch being connected to a coolant inlet of the hot heat exchanger, and an upstream end of the branch being connected to a coolant outlet of the hot heat exchanger.

12. The apparatus according to claim 1, wherein the first secondary coolant circuit includes a subsidiary three-port valve connected to an outlet of the first heat exchanger of the cold source, to an inlet of the subsidiary heat exchanger, and to an inlet of the cold heat exchanger.

13. The apparatus according to claim 1, wherein the second secondary coolant circuit includes a subsidiary three-port valve connected to an outlet of the second heat exchanger of the hot source, to an inlet of the subsidiary heat exchanger, and to an inlet of the hot heat exchanger.

14. The apparatus according to claim 1, wherein the first and second secondary coolant circuits include a common subsidiary three-port valve connected to an inlet of the first heat exchanger of the cold source, to an inlet of the second heat exchanger of the hot source, and to an outlet of the subsidiary heat exchanger.

15. The apparatus according to claim 1, wherein the main refrigerant circuit having the first and second heat exchangers in which the refrigerant fluid circulates is constituted by a plurality of segments grouped together in a single module in which the refrigerant fluid circulates, said module being designed to be connected to the secondary coolant circuits via the first and second heat exchangers, said segments being connected to one another preferably by welding.

16. The apparatus according to claim 1, wherein a coolant liquid in at least one of the first and second secondary circuits is a mixture of water and antifreeze.

* * * * *